US012613145B2

(12) United States Patent　　(10) Patent No.:　US 12,613,145 B2
Korus　　　　　　　　　　　　(45) Date of Patent:　　　Apr. 28, 2026

(54) TEMPERATURE ESTIMATION OF A SUSCEPTOR OF AN AEROSOL GENERATING DEVICE

(71) Applicant: NICOVENTURES TRADING LIMITED, London (GB)

(72) Inventor: Anton Korus, Derby (GB)

(73) Assignee: NICOVENTURES TRADING LIMITED, London (GB)

( * ) Notice: Subject to any disclaimer, the term of this patent is extended or adjusted under 35 U.S.C. 154(b) by 417 days.

(21) Appl. No.: 18/254,722

(22) PCT Filed: Nov. 30, 2021

(86) PCT No.: PCT/GB2021/053113
§ 371 (c)(1),
(2) Date: May 26, 2023

(87) PCT Pub. No.: WO2022/118005
PCT Pub. Date: Jun. 9, 2022

(65) Prior Publication Data
US 2024/0192061 A1　　Jun. 13, 2024

(30) Foreign Application Priority Data
Dec. 1, 2020　(GB) ..................................... 2018942

(51) Int. Cl.
*G01K 7/36*　　　(2006.01)
*A24F 40/465*　　(2020.01)
(Continued)

(52) U.S. Cl.
CPC .............. *G01K 7/36* (2013.01); *A24F 40/465* (2020.01); *A24F 40/53* (2020.01); *H05B 6/06* (2013.01)

(58) Field of Classification Search
CPC .. G01K 7/16; G01K 7/36; A24F 40/50; A24F 40/465; A24F 40/20; A24F 40/53; H05B 6/105; H05B 6/108; H05B 6/06
See application file for complete search history.

(56) References Cited

U.S. PATENT DOCUMENTS 3,781,506 A　　12/1973　Ketchum et al.
2011/0120989 A1　5/2011　Schilling et al.
(Continued)

FOREIGN PATENT DOCUMENTS

CN　　107436198 A　12/2017
CN　　210328043 U　　4/2020
(Continued)

OTHER PUBLICATIONS

Office Action (with English Translation) issued in corresponding Korean Patent Application No. 10-2023-7022117, mailed Jan. 24, 2025, all pages cited in its entirety.
(Continued)

*Primary Examiner* — Randy W Gibson
(74) *Attorney, Agent, or Firm* — BURR & FORMAN LLP

(57)　　　　　　　ABSTRACT

A method, apparatus and computer program can include applying a pulse edge to a resonant circuit including an inductive element (for inductively heating a susceptor) and a capacitor, wherein the applied pulse edge induces a pulse response between the capacitor and the inductive element of the resonant circuit, wherein the pulse response has a resonant frequency; determining a period or frequency of the resonant frequency of the pulse response; and converting the determined period or frequency into a temperature estimate based on a temperature gradient and a calibration measurement.

23 Claims, 8 Drawing Sheets

(51) Int. Cl.
    *A24F 40/53*     (2020.01)
    *H05B 6/06*     (2006.01)

(56)                    References Cited

U.S. PATENT DOCUMENTS

| | | |
|---|---|---|
| 2012/0199579 A1 | 8/2012 | Pateau et al. |
| 2014/0158678 A1 | 6/2014 | Thomann et al. |
| 2018/0148886 A1 | 5/2018 | Kalze et al. |
| 2018/0233954 A1 | 8/2018 | Yang et al. |
| 2020/0022412 A1 | 1/2020 | Abi Aoun et al. |
| 2024/0003712 A1* | 1/2024 | Korus ...................... G01D 5/20 |
| 2024/0195319 A1* | 6/2024 | Korus .................. H02M 7/4815 |
| 2024/0358078 A1* | 10/2024 | Korus ...................... H05B 6/06 |

FOREIGN PATENT DOCUMENTS

| | | |
|---|---|---|
| CN | 111380627 A | 7/2020 |
| GB | 2557251 A | 6/2018 |
| JP | 2009-543274 A | 12/2009 |
| JP | 2020-512662 A | 4/2020 |
| JP | 2020-516014 A | 5/2020 |
| JP | 2021-184390 A | 12/2021 |
| JP | 2021-534772 A | 12/2021 |
| JP | 2022-538289 A | 9/2022 |
| JP | 2022-538290 A | 9/2022 |
| JP | 2022-538292 A | 9/2022 |
| JP | 2022-189940 A | 12/2022 |
| JP | 2023-517509 A | 4/2023 |
| JP | 2023-550956 A | 12/2023 |
| KR | 1020190077566 A | 7/2019 |
| KR | 1020190130021 A | 11/2019 |
| WO | 2020020970 A1 | 1/2020 |
| WO | 2020043901 A1 | 3/2020 |

OTHER PUBLICATIONS

Office Action (with Partial English Translation) issued in corresponding Japanese Patent Application No. 2023-530816 mailed Mar. 4, 2025, all pages cited in its entirety.
International Search Report and Written Opinion received for PCT Patent Application No. PCT/GB2021/053113, mailed on Mar. 3, 2022, 13 pages.

* cited by examiner

Output

90

100

TEMPERATURE ESTIMATION OF A SUSCEPTOR OF AN AEROSOL GENERATING DEVICE

PRIORITY CLAIM

The present application is a National Phase entry of PCT Application No. PCT/GB2021/053113, filed Nov. 30, 2021, which claims priority from GB Application No. 2018942.9, filed Dec. 1, 2020, each of which is hereby fully incorporated herein by reference.

TECHNICAL FIELD

The present specification relates temperature estimation, for example to temperature estimation for an aerosol generating device.

BACKGROUND

Smoking articles, such as cigarettes, cigars and the like burn tobacco during use to create tobacco smoke. Attempts have been made to provide alternatives to these articles by creating products that release compounds without combusting. For example, tobacco heating devices heat an aerosol generating substrate such as tobacco to form an aerosol by heating, but not burning, the substrate.

SUMMARY

In a first aspect, this specification describes a method comprising: applying a pulse edge to a resonant circuit comprising an inductive element, for inductively heating a susceptor, and a capacitor, wherein the applied pulse edge induces a pulse response between the capacitor and the inductive element of the resonant circuit, wherein the pulse response has a resonant frequency; determining a period or frequency of the resonant frequency of said pulse response; and converting the determined period or frequency into a temperature estimate based on a temperature gradient (e.g. a rate of change of the resonant frequency of said pulse response with respect to temperature) and a calibration measurement. The pulse edge may form part of an off-resonance pulse.

In some example embodiments, converting the determined period or frequency into said temperature estimate may comprise: subtracting the calibration measurement from the determined period or frequency of the resonant frequency of said pulse response; and dividing the result of the subtraction by said temperature gradient.

The calibration measurement may define a first period or frequency of the resonant frequency of said pulse response at a first temperature (e.g. room temperature).

The calibration measurement may, for example, be obtained by subtracting the product of said gradient and a calibration temperature from a period of said pulse response at said calibration temperature.

The method may comprise determining said calibration measurement. Alternatively, or in addition, the method may comprise determining said gradient.

In a second aspect, this specification describes an apparatus comprising: a resonant circuit comprising an inductive element and a capacitor, wherein the inductive element is for inductively heating a susceptor; a driving circuit (such as an H-bridge circuit or a half bridge circuit) for applying a pulse edge to said resonant circuit, wherein the applied pulse edge induces a pulse response between the capacitor and the inductive element of the resonant circuit, wherein the pulse response has a resonant frequency; and a processor for: determining a period or frequency of the resonant frequency of said pulse response and converting the determined period or frequency into a temperature estimate based on a temperature gradient and a calibration measurement. The inductive element and the capacitor may be connected in series.

The processor may convert the determined period or frequency into said temperature estimate by: subtracting the calibration measurement from the determined period or frequency of the resonant frequency of said pulse response; and dividing the result of the subtraction by said temperature gradient.

The processor may be for determining said calibration measurement. Alternatively, or in addition, the processor may be for determining said gradient.

In a third aspect, this specification describes a non-combustible aerosol generating device comprising an apparatus as described above with reference to the second aspect. The aerosol generating device may be configured to receive a removable article comprising an aerosol generating material. The aerosol generating material may, for example, comprise an aerosol generating substrate and an aerosol forming material. The removable article may include a susceptor arrangement.

In a fourth aspect, this specification describes a kit of parts comprising an article for use in a non-combustible aerosol generating system, wherein the non-combustible aerosol generating system comprises an apparatus as described above with reference to the second aspect or an aerosol generating device as described above with reference to the third aspect. The article may be a removable article comprising an aerosol generating material.

In a fifth aspect, this specification describes a computer program comprising instructions for causing an apparatus to perform at least the following: apply a pulse edge to a resonant circuit comprising an inductive element, for inductively heating a susceptor, and a capacitor, wherein the applied pulse edge induces a pulse response between the capacitor and the inductive element of the resonant circuit, wherein the pulse response has a resonant frequency; determine a period or frequency of the resonant frequency of said pulse response; and convert the determined period or frequency into a temperature estimate based on a temperature gradient and a calibration measurement. The computer program may be further configured to perform any aspect of the method described above with reference to the first aspect.

BRIEF DESCRIPTION OF THE DRAWINGS

Example embodiments will now be described, by way of example only, with reference to the following schematic drawings, in which.

DETAILED DESCRIPTION OF THE DRAWINGS

Figure 1:
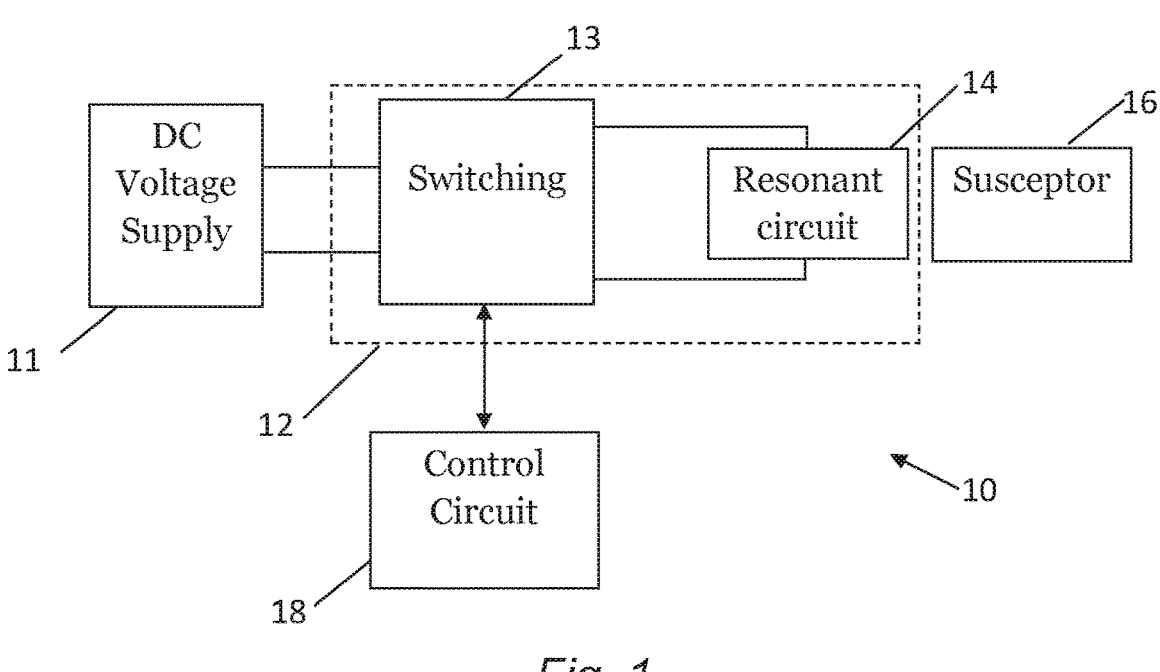
FIG. 1 is a block diagram of a system in accordance with an example embodiment.

As used herein, the term "aerosol delivery device" is intended to encompass systems that deliver a substance to a user, and includes:

non-combustible aerosol provision systems that release compounds from an aerosolizable material without combusting the aerosolizable material, such as electronic cigarettes, tobacco heating products, and hybrid systems to generate aerosol using a combination of aerosolizable materials; and articles comprising aerosolizable material and configured to be used in one of these non-combustible aerosol provision systems.

According to the present disclosure, a "combustible" aerosol provision system is one where a constituent aerosolizable material of the aerosol provision system (or component thereof) is combusted or burned in order to facilitate delivery to a user.

According to the present disclosure, a "non-combustible" aerosol provision system is one where a constituent aerosolizable material of the aerosol provision system (or component thereof) is not combusted or burned in order to facilitate delivery to a user.

In embodiments described herein, the delivery system is a non-combustible aerosol provision system, such as a powered non-combustible aerosol provision system.

In one embodiment, the non-combustible aerosol provision system is an electronic cigarette, also known as a vaping device or electronic nicotine delivery system (END), although it is noted that the presence of nicotine in the aerosolizable material is not a requirement.

In one embodiment, the non-combustible aerosol provision system is a tobacco heating system, also known as a heat-not-burn system.

In one embodiment, the non-combustible aerosol provision system is a hybrid system to generate aerosol using a combination of aerosolizable materials, one or a plurality of which may be heated. Each of the aerosolizable materials may be, for example, in the form of a solid, liquid or gel and may or may not contain nicotine. In one embodiment, the hybrid system comprises a liquid or gel aerosolizable material and a solid aerosolizable material. The solid aerosolizable material may comprise, for example, tobacco or a non-tobacco product.

Typically, the non-combustible aerosol provision system may comprise a non-combustible aerosol provision device and an article for use with the non-combustible aerosol provision system. However, it is envisaged that articles which themselves comprise a means for powering an aerosol generating component may themselves form the non-combustible aerosol provision system.

In one embodiment, the non-combustible aerosol provision device may comprise a power source and a controller.

The power source may be an electric power source or an exothermic power source. In one embodiment, the exothermic power source comprises a carbon substrate which may be energized so as to distribute power in the form of heat to an aerosolizable material or heat transfer material in proximity to the exothermic power source. In one embodiment, the power source, such as an exothermic power source, is provided in the article so as to form the non-combustible aerosol provision.

In one embodiment, the article for use with the non-combustible aerosol provision device may comprise an aerosolizable material, an aerosol generating component, an aerosol generating area, a mouthpiece, and/or an area for receiving aerosolizable material.

In one embodiment, the aerosol generating component is a heater capable of interacting with the aerosolizable material so as to release one or more volatiles from the aerosolizable material to form an aerosol. In one embodiment, the aerosol generating component is capable of generating an aerosol from the aerosolizable material without heating. For example, the aerosol generating component may be capable of generating an aerosol from the aerosolizable material without applying heat thereto, for example via one or more of vibrational, mechanical, pressurization or electrostatic means.

In one embodiment, the aerosolizable material may comprise an active material, an aerosol forming material and optionally one or more functional materials. The active material may comprise nicotine (optionally contained in tobacco or a tobacco derivative) or one or more other non-olfactory physiologically active materials. A non-olfactory physiologically active material is a material which is included in the aerosolizable material in order to achieve a physiological response other than olfactory perception. The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical. In some embodiments, the active substance comprises nicotine. In some embodiments, the active substance comprises caffeine, melatonin or vitamin B12.

The aerosol forming material may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more functional materials may comprise one or more of flavors, carriers, pH regulators, stabilizers, and/or antioxidants.

In one embodiment, the article for use with the non-combustible aerosol provision device may comprise aerosolizable material or an area for receiving aerosolizable material. In one embodiment, the article for use with the non-combustible aerosol provision device may comprise a mouthpiece. The area for receiving aerosolizable material may be a storage area for storing aerosolizable material. For example, the storage area may be a reservoir. In one embodiment, the area for receiving aerosolizable material may be separate from, or combined with, an aerosol generating area.

Aerosolizable material, which also may be referred to herein as aerosol generating material, is material that is capable of generating aerosol, for example when heated, irradiated or energized in any other way. Aerosolizable material may, for example, be in the form of a solid, liquid or gel which may or may not contain nicotine and/or flavorants. In some embodiments, the aerosolizable material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it.

The aerosolizable material may be present on a substrate. The substrate may, for example, be or comprise paper, card, paperboard, cardboard, reconstituted aerosolizable material, a plastics material, a ceramic material, a composite material, glass, a metal, or a metal alloy.

A consumable is an article comprising or consisting of aerosol-generating material, part or all of which is intended to be consumed during use by a user. A consumable may comprise one or more other components, such as an aerosol-generating material storage area, an aerosol-generating material transfer component, an aerosol generation area, a housing, a wrapper, a mouthpiece, a filter and/or an aerosol-modifying agent. A consumable may also comprise an aerosol generator, such as a heater, that emits heat to cause the aerosol-generating material to generate aerosol in use. The heater may, for example, comprise combustible material, a material heatable by electrical conduction, or a susceptor.

FIG. 1 is a block diagram of a system, indicated generally by the reference numeral 10, in accordance with an example embodiment. The system 10 comprises a power source in the form of a direct current (DC) voltage supply 11, a switching arrangement 13, a resonant circuit 14, a susceptor arrangement 16, and a control circuit 18. The switching arrangement 13 and the resonant circuit 14 may be coupled together in an inductive heating arrangement 12 that can be used to heat the susceptor 16.

As discussed in detail below, the resonant circuit 14 may comprise a capacitor and one or more inductive elements for inductively heating the susceptor arrangement 16 to heat an aerosol generating material. Heating the aerosol generating material may thereby generate an aerosol.

The switching arrangement 13 may enable an alternating current to be generated from the DC voltage supply 11 (under the control of the control circuit 18). The alternating current may flow through the one or more inductive elements and may cause the heating of the susceptor arrangement 16. The switching arrangement may comprise a plurality of transistors. Example DC-AC converters include H-bridge or inverter circuits, examples of which are discussed below.

A susceptor is a material that is heatable by penetration with a varying magnetic field, such as an alternating magnetic field. The heating material may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The heating material may be both electrically-conductive and magnetic, so that the heating material is heatable by both heating mechanisms.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

In one embodiment, the susceptor is in the form of a closed circuit. It has been found in some embodiments that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Figure 2:
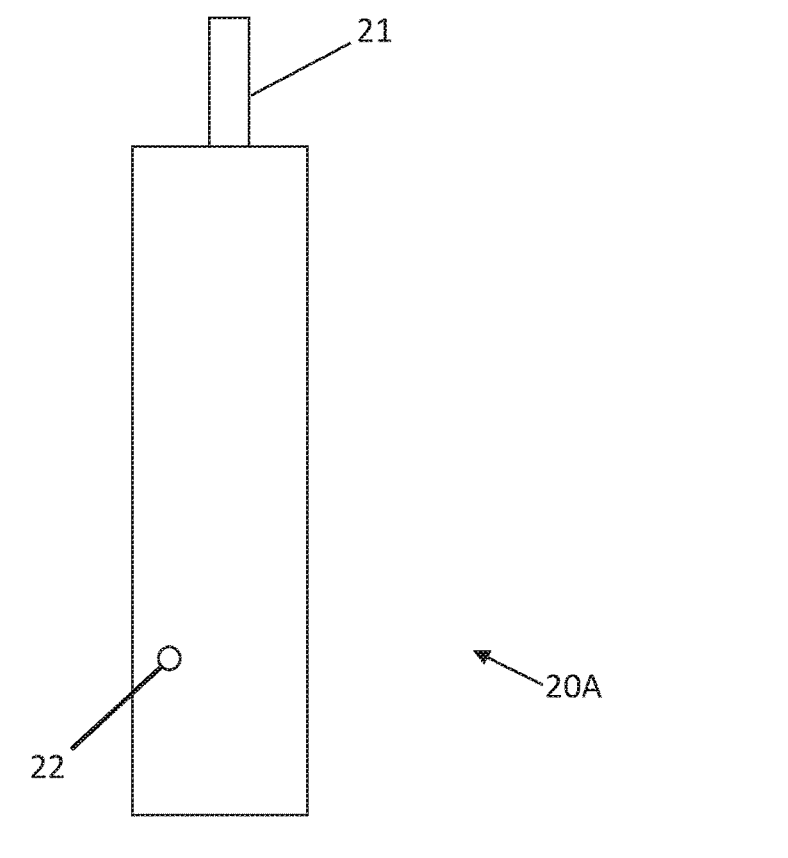
FIG. 2 shows a non-combustible aerosol provision device in accordance with an example embodiment.
Figure 3:
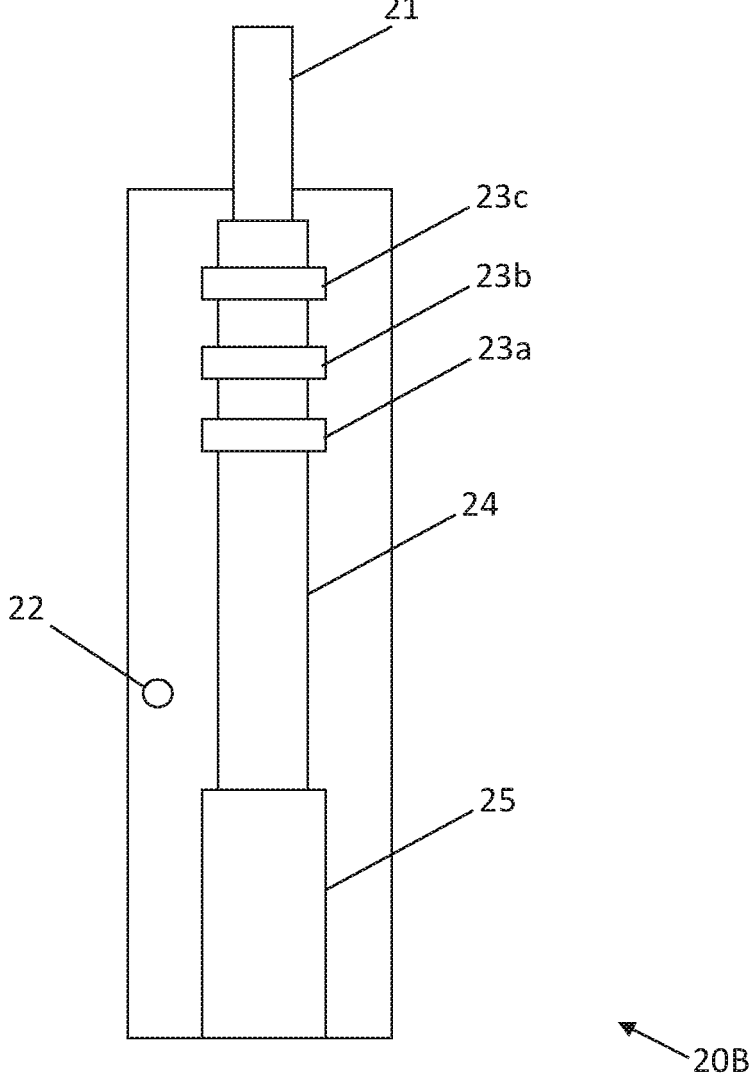
FIG. 3 is a view of a non-combustible aerosol provision device in accordance with an example embodiment.

FIGS. 2 and 3 show a non-combustible aerosol provision device, indicated generally by the reference numeral 20, in accordance with an example embodiment. FIG. 2 is a perspective illustration of an aerosol provision device 20A with an outer cover. The aerosol provision device 20A may comprise a replaceable article 21 that may be inserted in the aerosol provision device 20A to enable heating of a susceptor (which may be comprised within the article 21, as discussed further below). The aerosol provision device 20A may further comprise an activation switch 22 that may be used for switching on or switching off the aerosol provision device 20A.

FIG. 3 depicts an aerosol provision device 20B with the outer cover removed. The aerosol generating device 20B comprises the article 21, the activation switch 22, a plurality of inductive elements 23*a*, 23*b*, and 23*c*, and one or more air tube extenders 24 and 25. The one or more air tube extenders 24 and 25 may be optional.

The plurality of inductive elements 23*a*, 23*b*, and 23*c* may each form part of a resonant circuit, such as the resonant circuit 14. The inductive element 23*a* may comprise a helical inductor coil. In one example, the helical inductor coil is made from Litz wire/cable which is wound in a helical fashion to provide the helical inductor coil. Many alternative inductor formations are possible, such as inductors formed within a printed circuit board. The inductive elements 23*b* and 23*c* may be similar to the inductive element 23*a*. The use of three inductive elements 23*a*, 23*b* and 23*c* is not essential to all example embodiments. Thus, the aerosol generating device 20 may comprise one or more inductive elements.

A susceptor may be provided as part of the article 21. In an example embodiment, when the article 21 is inserted in aerosol generating device 20, the aerosol generating device 20 may be turned on due to the insertion of the article 21. This may be due to detecting the presence of the article 21 in the aerosol generating device using an appropriate sensor (e.g., a light sensor) or, in cases where the susceptor forms a part of the article 21, by detecting the presence of the susceptor using the resonant circuit 14, for example. When the aerosol generating device 20 is turned on, the inductive elements 23 may cause the article 21 to be inductively heated through the susceptor. In an alternative embodiment, the susceptor may be provided as part of the aerosol generating device 20 (e.g. as part of a holder for receiving the article 21).

Figure 4:
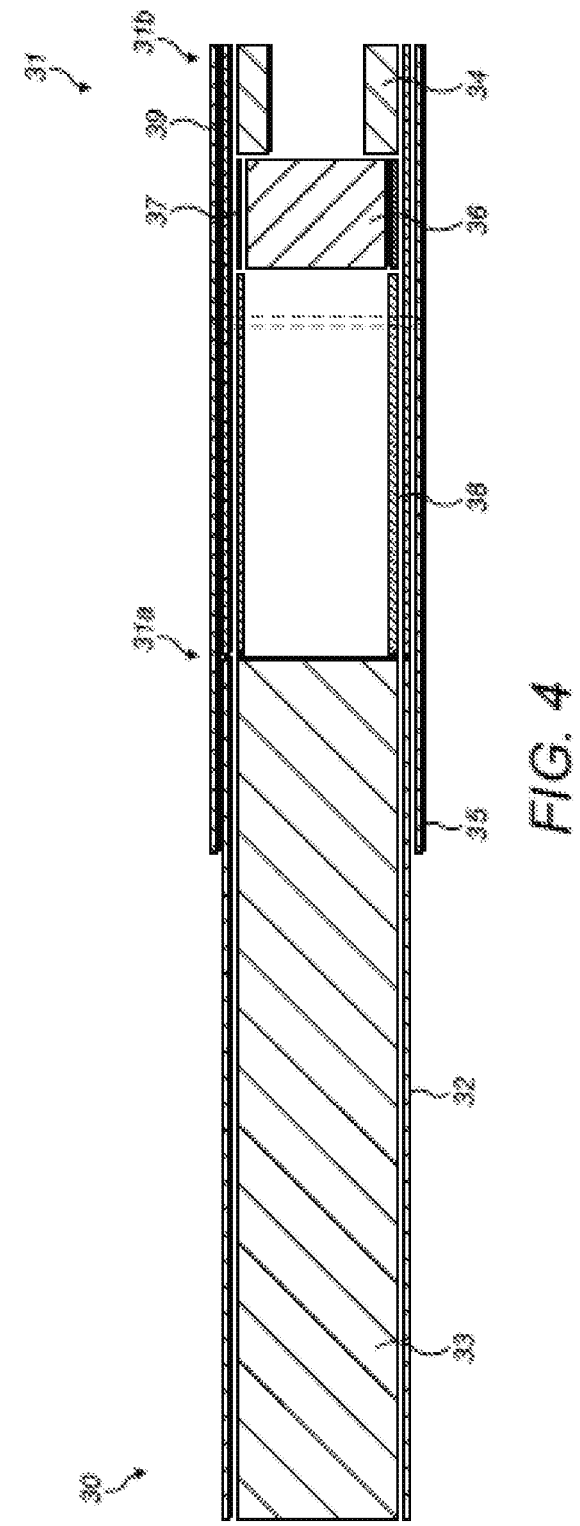
FIG. 4 is a view of an article for use with a non-combustible aerosol provision device in accordance with an example embodiment.

FIG. 4 is a view of an article, indicated generally by the reference numeral 30, for use with a non-combustible aerosol provision device in accordance with an example embodiment. The article 30 is an example of the replaceable article 21 described above with reference to FIGS. 2 and 3.

The article 30 comprises a mouthpiece 31, and a cylindrical rod of aerosol generating material 33, in the present case tobacco material, connected to the mouthpiece 31. The aerosol generating material 33 provides an aerosol when heated, for instance within a non-combustible aerosol generating device, such as the aerosol generating device 20, as described herein. The aerosol generating material 33 is wrapped in a wrapper 32. The wrapper 32 can, for instance, be a paper or paper-backed foil wrapper. The wrapper 32 may be substantially impermeable to air.

In one embodiment, the wrapper 32 comprises aluminum foil. Aluminum foil has been found to be particularly effective at enhancing the formation of aerosol within the aerosol generating material 33. In one example, the aluminum foil has a metal layer having a thickness of about 6 μm. The aluminum foil may have a paper backing. However, in alternative arrangements, the aluminum foil can have other thicknesses, for instance between 4 μm and 16 μm in thickness. The aluminum foil also need not have a paper backing, but could have a backing formed from other materials, for instance to help provide an appropriate tensile strength to the foil, or it could have no backing material. Metallic layers or foils other than aluminum can also be used. Moreover, it is not essential that such metallic layers are provided as part of the article 30; for example, such a metallic layer could be provided as part of the apparatus 20.

The aerosol generating material 33, also referred to herein as an aerosol generating substrate 33, comprises at least one aerosol forming material. In the present example, the aerosol forming material is glycerol. In alternative examples, the aerosol forming material can be another material as described herein or a combination thereof. The aerosol forming material has been found to improve the sensory performance of the article, by helping to transfer compounds such as flavor compounds from the aerosol generating material to the consumer.

As shown in FIG. 4, the mouthpiece 31 of the article 30 comprises an upstream end 31*a* adjacent to an aerosol generating substrate 33 and a downstream end 31*b* distal from the aerosol generating substrate 33. The aerosol generating substrate may comprise tobacco, although alternatives are possible.

The mouthpiece 31, in the present example, includes a body of material 36 upstream of a hollow tubular element 34, in this example adjacent to and in an abutting relationship with the hollow tubular element 34. The body of material 36 and hollow tubular element 34 each define a substantially cylindrical overall outer shape and share a common longitudinal axis. The body of material 36 is wrapped in a first plug wrap 37. The first plug wrap 37 may have a basis weight of less than 50 gsm, such as between about 20 gsm and 40 gsm.

In the present example the hollow tubular element 34 is a first hollow tubular element 34 and the mouthpiece includes a second hollow tubular element 38, also referred to as a cooling element, upstream of the first hollow tubular element 34. In the present example, the second hollow tubular element 38 is upstream of, adjacent to and in an abutting relationship with the body of material 36. The body of material 36 and second hollow tubular element 38 each define a substantially cylindrical overall outer shape and share a common longitudinal axis. The second hollow tubular element 38 is formed from a plurality of layers of paper which are parallel wound, with butted seams, to form the tubular element 38. In the present example, first and second paper layers are provided in a two-ply tube, although in other examples 3, 4 or more paper layers can be used forming 3, 4 or more ply tubes. Other constructions can be used, such as spirally wound layers of paper, cardboard tubes, tubes formed using a papier-mâché type process, molded or extruded plastic tubes or similar. The second hollow tubular element 38 can also be formed using a stiff plug wrap and/or tipping paper as the second plug wrap 39 and/or tipping paper 35 described herein, meaning that a separate tubular element is not required.

The second hollow tubular element 38 is located around and defines an air gap within the mouthpiece 31 which acts as a cooling segment. The air gap provides a chamber through which heated volatilized components generated by the aerosol generating material 33 may flow. The second hollow tubular element 38 is hollow to provide a chamber for aerosol accumulation yet rigid enough to withstand axial compressive forces and bending moments that might arise during manufacture and whilst the article 21 is in use. The second hollow tubular element 38 provides a physical displacement between the aerosol generating material 33 and the body of material 36. The physical displacement provided by the second hollow tubular element 38 will provide a thermal gradient across the length of the second hollow tubular element 38.

Of course, the article 30 is provided by way of example only. The skilled person will be aware of many alternative arrangements of such an article that could be used in the systems described herein.

Figure 5:
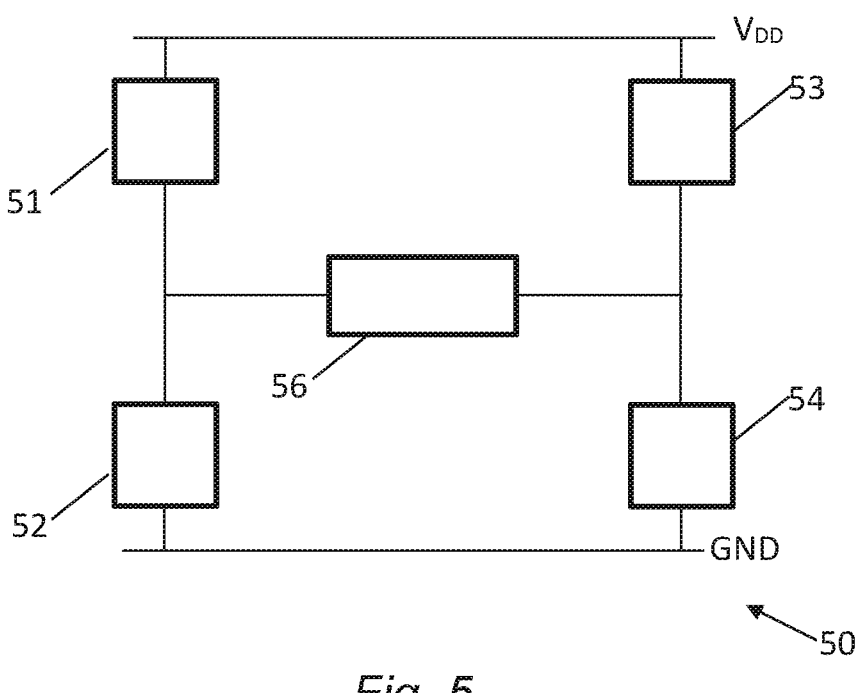
FIGS. 5 and 6 are block diagrams of circuits in accordance with example embodiments.

FIG. 5 is a block diagram of a circuit, indicated generally by the reference numeral 50, in accordance with an example embodiment. The circuit 50 comprises a first switch 51, a second switch 52, a third switch 53, a fourth switch 54 and a resonant circuit 56. The first to fourth switches 51 to 54 may be implemented using transistors, as discussed further below.

The first to fourth switches 51 to 54 form an H-bridge bridge circuit that may be used to apply pulses to the resonant circuit 56. Thus the first to fourth switches 51 to 54 are an example implementation of the switching arrangement 13 and the resonant circuit 56 is an example of the resonant circuit 14.

The first and second switches 51 and 52 form a first limb of the bridge circuit and the third and fourth switches 53 and 54 form a second limb. More specifically, the first switch 51 can selectively provide a connection between a first power source (labelled VDD in FIG. 5) and a first connection point, the second switch 52 can selectively provide a connection between the first connection point and ground, the third switch 53 can selectively provide a connection between the first power source and a second connection point and the fourth switch 54 can selectively provide a connection between the second connection point and ground. The resonant circuit 56 is provided between the first and second connection points.

Figure 6:
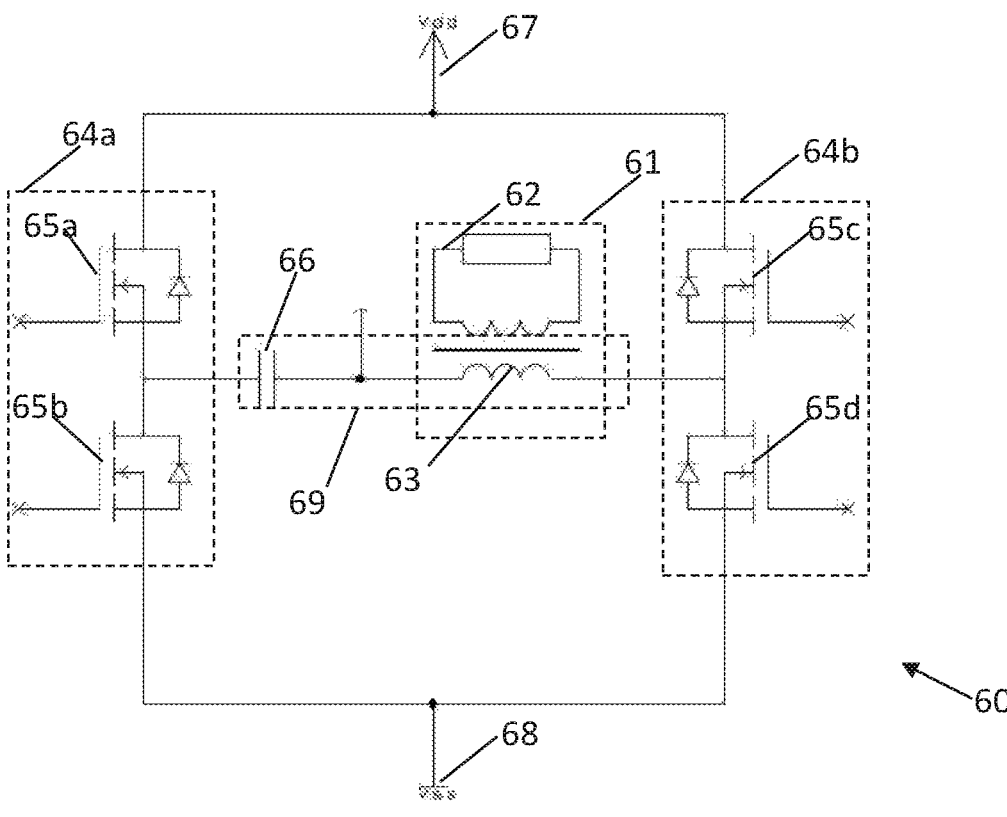

FIG. 6 is a block diagram of a circuit, indicated generally by the reference numeral 60, in accordance with an example embodiment. The circuit 60 is an example implementation of the circuit 50 described above.

The circuit 60 comprises a positive terminal 67 and a negative (ground) terminal 68 (that are an example implementation of the DC voltage supply 11 of the system 10 described above). The circuit 60 comprises a switching arrangement 64 (implementing the switching arrangement 13 described above), where the switching arrangement 64 comprises a bridge circuit (e.g. an H-bridge circuit, such as an FET H-bridge circuit). The switching arrangement 64 comprises a first limb 64a and a second limb 64b, where the first limb 64a and the second limb 64b are coupled by a resonant circuit 69 (which resonant circuit implements the resonant circuits 14 and 56 described above). The first limb 64a comprises switches 65a and 65b (implementing the switches 51 and 52 described above), and the second limb 64b comprises switches 65c and 65d (implementing the switches 53 and 54 described above). The switches 65a, 65b, 65c, and 65d may be transistors, such as field-effect transistors (FETs), and may receive inputs from a controller, such as the control circuit 18 of the system 10.

The resonant circuit 69 comprises a capacitor 66 and an inductive element 63 such that the resonant circuit 69 may be an LC resonant circuit. The circuit 60 further shows a susceptor equivalent circuit 62 (thereby implementing the susceptor arrangement 16). The susceptor equivalent circuit 62 comprises a resistance and an inductive element that indicate the electrical effect of an example susceptor arrangement 16. When a susceptor is present, the susceptor arrangement 62 and the inductive element 63 may act as a transformer 61. Transformer 61 may produce a varying magnetic field such that the susceptor is heated when the circuit 60 receives power. During a heating operation, in which the susceptor arrangement 16 is heated by the inductive arrangement, the switching arrangement 64 is driven (e.g., by control circuit 18) such that each of the first and second branches are coupled in turn such that an alternating current is passed through the resonant circuit 69. The resonant circuit 69 will have a resonant frequency, which is based in part on the susceptor arrangement 16, and the control circuit 18 may be configured to control the switching arrangement 64 to switch at the resonance frequency or a frequency close to the resonant frequency. Driving the switching circuit at or close to resonance helps improve efficiency and reduces the energy being lost to the switching elements (which causes unnecessary heating of the switching elements). In an example in which the article 21 comprising an aluminum foil is to be heated, the switching arrangement 64 may be driven at a frequency of around 2.5 MHz. However, in other implementations, the frequency may, for example, be anywhere between 500 kHz to 4 MHz.

Figure 7:
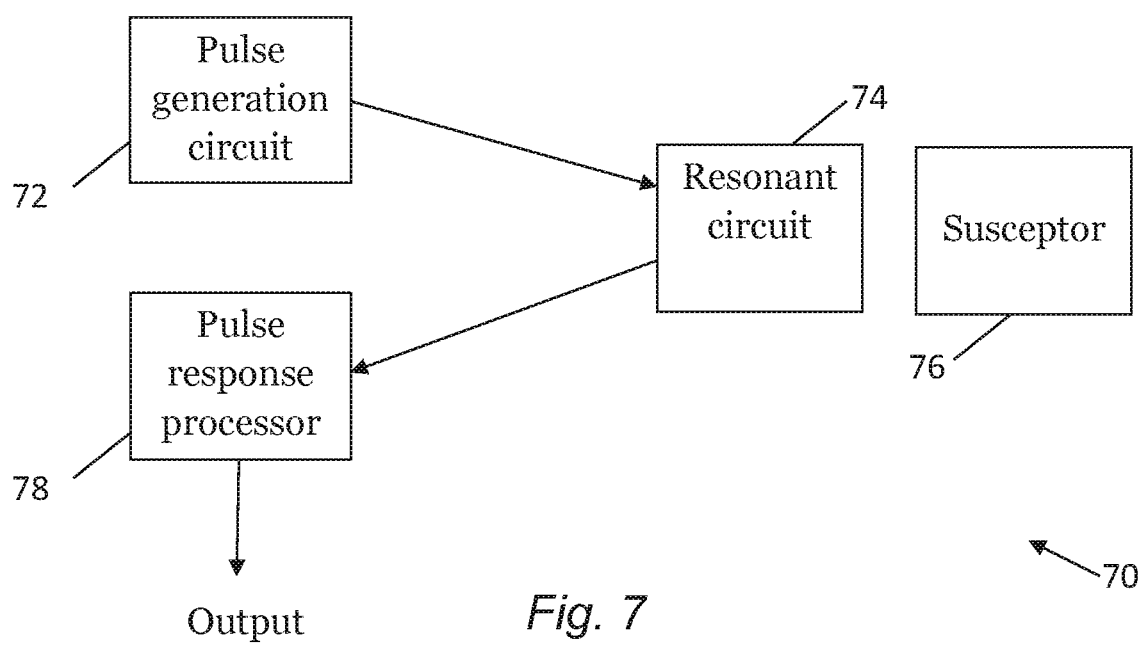
FIG. 7 is a block diagram of a system in accordance with an example embodiment.

FIG. 7 is a block diagram of a system, indicated generally by the reference numeral 70, in accordance with an example embodiment.

The system 70 comprises a pulse generation circuit 72, a resonant circuit 74 (such as the resonant circuits 56 and 69), a susceptor 76 (such as the susceptor 16) and a pulse response processor 78. The pulse generation circuit 72 and the pulse response processor 74 may be implemented as part of the control circuit 18 of the system 10.

The pulse generation circuit 72 may be implemented using the switching arrangements of the circuits 50 and 60 described above in order to generate a pulse (e.g. pulse edges) by switching between positive and negative voltage sources. This is not essential to all example embodiments; for example, the pulse generation circuit 72 may be implemented using a half-bridge circuit, as discussed further below.

The pulse response processor 78 may determine one or more performance metrics (or characteristics) of the resonant circuit 74 and the susceptor 76 based on the pulse response. For example the pulse response processor 78 may generate an estimate of the temperature of the susceptor 76.

Figure 8:
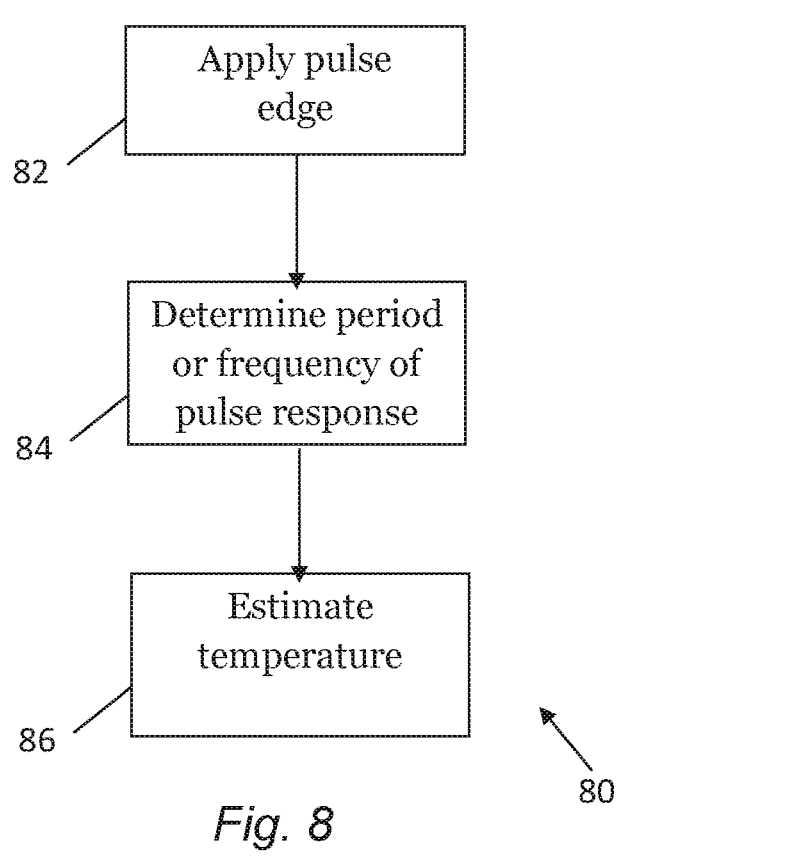
FIG. 8 is a flow chart showing an algorithm in accordance with an example embodiment.

FIG. 8 is a flow chart showing an algorithm, indicated generally by the reference numeral 80, in accordance with an example embodiment. The algorithm 80 shows an example use of the system 70.

The algorithm 80 starts at operation 82 where a pulse edge is applied to the resonant circuit 74. The pulse edge is a rising or falling edge generated by the pulse generation circuit 72.

Figure 9:
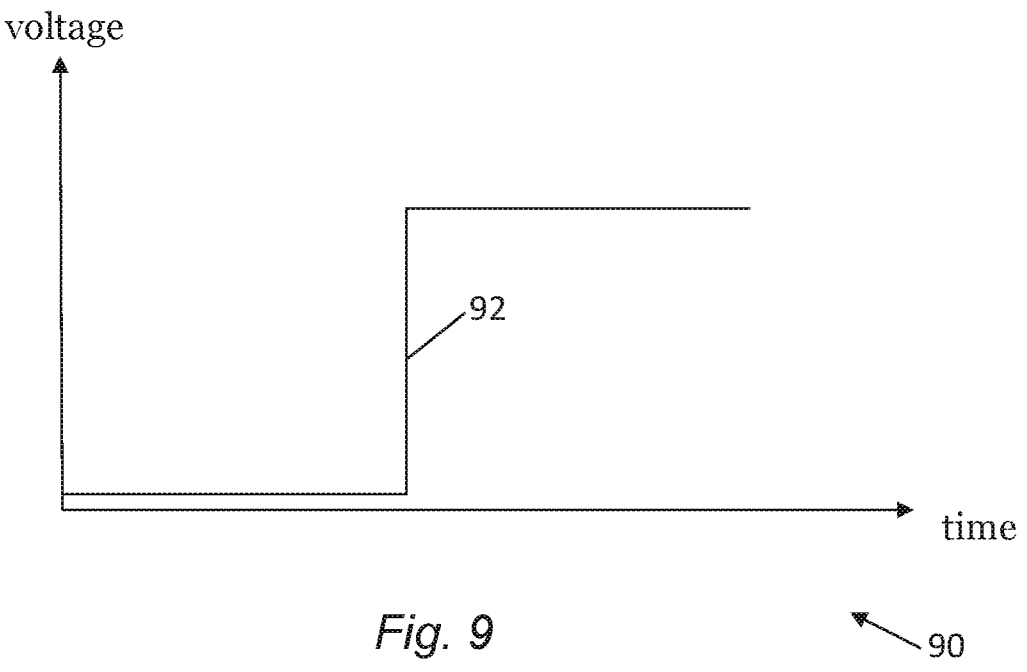
FIG. 9 is a plot showing a pulse in accordance with an example embodiment.

FIG. 9 is a plot showing a pulse 90 in accordance with an example embodiment. The pulse 90 is includes a rising pulse edge 92 that is an example of a pulse edge that may be applied in the operation 82. The pulse 90 may be generated by the pulse generation circuit 72 (e.g. by an H-bridge or half-bridge circuit).

The pulse 90 may be applied to the resonant circuit 74. Alternatively, in systems having multiple inductive elements (such as non-combustible aerosol arrangement 20 described above with reference to FIGS. 2 and 3), the pulse generation circuit 72 may select one of a plurality of resonant circuits, each resonant circuit comprising an inductive element for inductively heating a susceptor and a capacitor, wherein the applied pulse induces an pulse response between the capacitor and the inductive element of the selected resonant circuit.

The application of the pulse edge 92 to the resonant circuit generates a pulse response.

Figure 10:
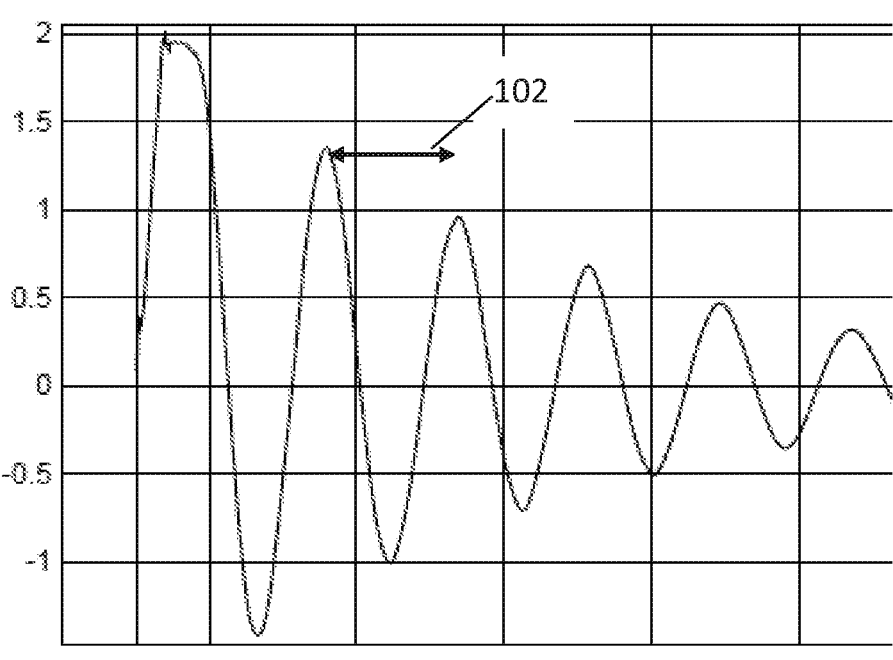
FIGS. 10 and 11 are plots showing pulse responses in accordance with example embodiments.

FIG. 10 is a plot, indicated generally by the reference numeral 100, showing an example pulse response that might be generated at a connection point between the capacitor 66 and the inductor 63 of the resonant circuit 69 in response to the pulse edge 92. As shown in FIG. 10, the pulse response 100 may take the form of a ringing resonance. The pulse response is a result of charge bouncing between the inductor(s) and capacitor of the resonant circuit. In one arrangement, no heating of the susceptor is caused as a result. That is, the temperature of the susceptor remains substantially constant (e.g., within ±1° C. or ±0.1° C. of the temperature prior to applying the pulse). As shown in FIG. 10, the pulse response 100 has a resonant frequency having a period 102 (that period being the time between successive peaks of the ringing response).

Figure 11:
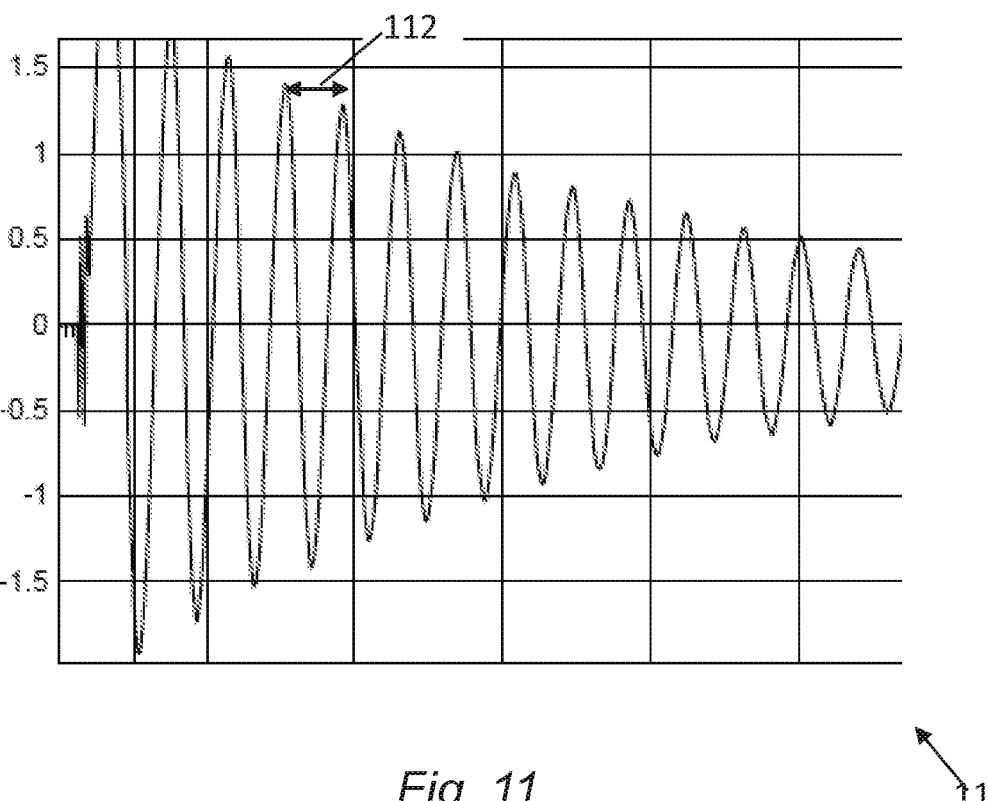

FIG. 11 is a plot, indicated generally by the reference numeral 110, showing another example pulse response that might be generated in response to the pulse edge 92. The pulse response 110 has a resonant frequency having a period 112.

At operation 84 of the algorithm 80, a period or frequency of the resonant frequency of the pulse response generated in response to the applied pulse edge is determined (e.g. by the pulse response processor 78). For the example pulse response 100, the period or frequency determined in the operation 84 is the period 102. Similarly, for the example pulse response 110, the period or frequency determined in the operation 84 is the period 112.

At operation 86 of the algorithm 80, the period or frequency determined in the operation 84 is converted into a temperature estimate, as discussed in detail below.

The voltage ($V_0$) of the pulse responses 100 and 110 may be expressed mathematically as:

$$V_0 = \sin(\omega_d t) \cdot e^{-\alpha t}$$

Where:

$\omega_d$ is the damped resonant frequency of the system (including a susceptor).

The relationship between alpha decay and damped frequency oscillation may be given by:

$$\omega_d = \sqrt{\omega_n^2 - \alpha^2}$$

$$\text{where } \omega_n = \frac{1}{\sqrt{LC}}; \text{ and}$$

$$\alpha = \frac{r_{coil} + r_{sus}}{2L}$$

Where:

$\omega_n$ is the natural resonant frequency of the system (without the susceptor).

$r_{coil}$ is the coil resistance; and $r_{sus}$ is the reflective susceptor resistance.

The period that is measured in the operation 84 described above is based on the damped frequency ($\omega_d$).

Figure 12:
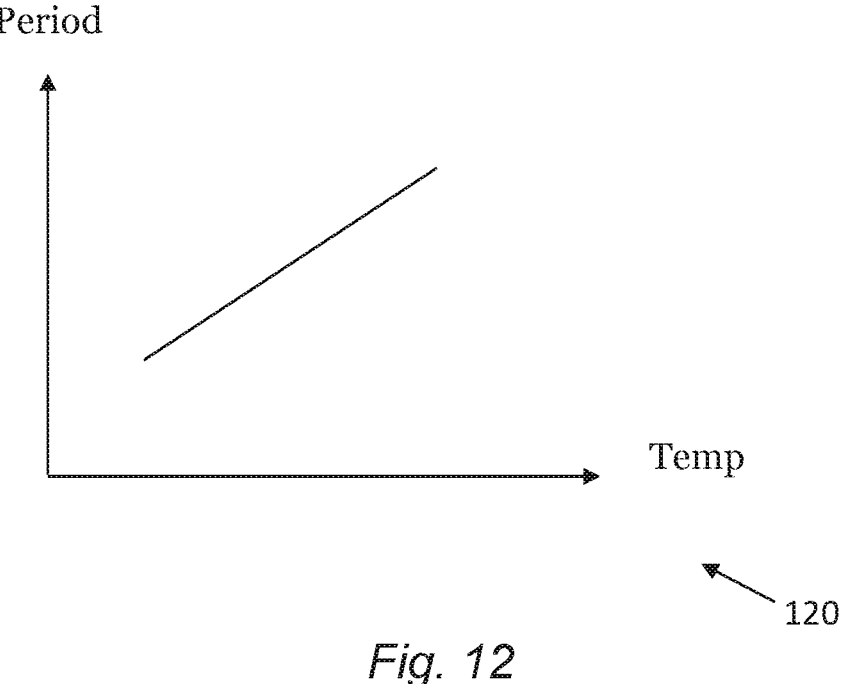
FIG. 12 is a plot showing a relationship between pulse response period and temperature in accordance with an example embodiment.

FIG. 12 is a plot, indicated generally by the reference numeral 120, showing a relationship between pulse response period and temperature in accordance with an example embodiment.

As an inductive heating system, such as the circuits 50 or 60 or the system 70, warms, the resistances in the system change. This results in a change in the resonant frequency (and hence the period of the pulse response determined in the operation 84 described above). As show in the example plot 120, the pulse response period may increase as the temperature increases. In some example embodiments this change in linear (or almost linear) and so can be used for temperature measurement estimations.

If the characteristics of the plot 120 are known, then the period or frequency (e.g. the damped frequency of the system) determined in the operation 84 can be converted into a temperature estimate in the operation 86.

In the operation 86, the temperature (x) may be given by the formula:

$$x = \frac{y - c}{m}$$

where:

y is the period determined in the operation 84;

c is a calibration value; and m is the gradient of the plot 120.

The gradient m can be determined from two data points (x1, y1) and (x2, y2) as follows:

$$m = \frac{y2 - y1}{x2 - x1}$$

The calibration value c may be given by:

$$c = -ma + b$$

where:

m is the gradient discussed above;

a is a calibration temperature (e.g. room temperature);

b is the pulse response period at the calibration temperature.

For example, assume that a pulse response period of 400 ns was measured at a calibration temperature of 20 degrees centigrade. If the gradient of the plot 120 has been determined to be 250 picoseconds per degree centigrade, then the values above are given by:

$$m = 250 \text{ ps}/^\circ \text{ C.} = 0.25 \text{ ns}/^\circ \text{ C.}$$

$$c = -0.250 * 20 + 400 = 395$$

Thus, if a period of 420 ns is determined in the operation 84, this can be converted in the operation 86 into a temperature estimate using the formula:

$$x = \frac{y - c}{m}$$

$$x = \frac{420 - 395}{0.250} = 100$$

Thus, the temperature estimate x is 100° C.

Figure 13:
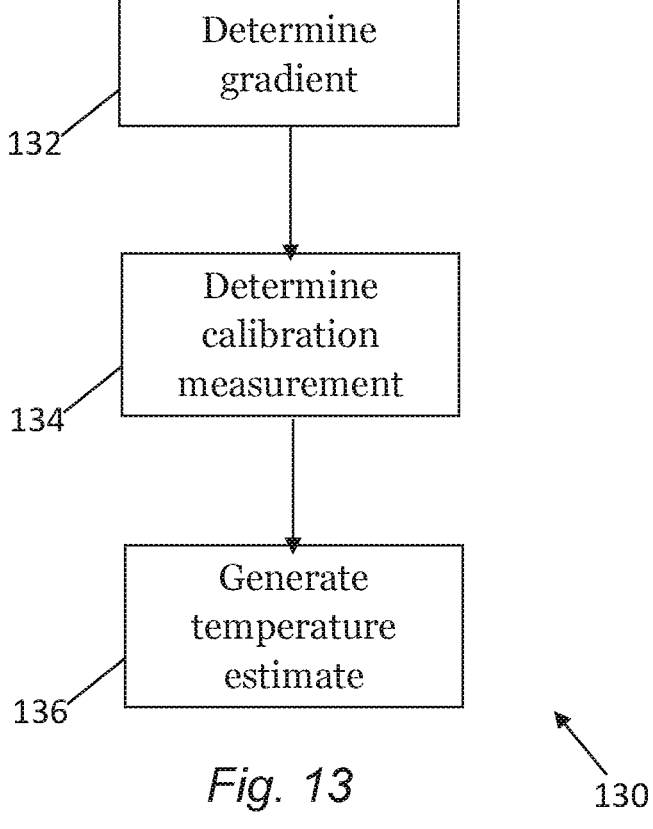
FIG. 13 is a flow chart showing an algorithm in accordance with an example embodiment.

FIG. 13 is a flow chart showing an algorithm, indicated generally by the reference numeral 130, in accordance with an example embodiment.

At operation 132, the gradient of the system in determined. The gradient is the rate of change of the resonant frequency of said pulse response with respect to temperature. The gradient may be generated once (as part of an initialization process) and may then be stored and not changed (or only rarely changed). Alternatively, the gradient measurement may be updated from time-to-time (e.g. periodically or in response to a determination that the gradient measurement may be unreliable).

At operation 134, a calibration measurement is determined. The calibration measurement may be determined by determining a period or frequency of a resonant frequency at a known temperature (e.g. a measured temperature). For example, the system may be calibrated based on a known room temperature (e.g. during a calibration process). Thus room temperature may be measured (e.g. using a thermocouple) and a pulse duration measured at this known room temperature.

The calibration measurement may be a one-time measurement that is stored. Alternatively, the calibration measurement may be taken repeatedly, such as whenever the configuration of the system may have changed. There are many possible calibration arrangements. For example, for systems having removable article including a susceptor arrangement for heating, the system may be recalibrated each time the removable article is changed.

At operation 136, a temperature estimate is generated. The operation 136 may be implemented using the algorithm 100 described above.

As described above, the pulse edge may be generated in the operation 82 using a full-bridge circuit. This is not essential; for example, a half-bridge circuit may be used.

Figure 14:
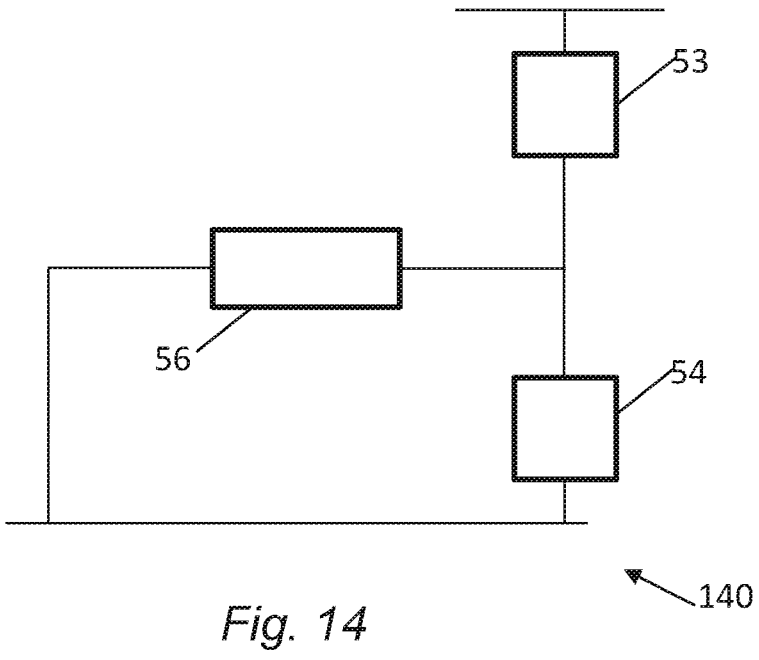
FIG. 14 is a block diagram of a circuit in accordance with an example embodiment.

FIG. 14 is a block diagram of a circuit, indicated generally by the reference numeral 140, in accordance with an example embodiment. The circuit 140 comprises the third switch 53, the fourth switch 54 and the resonant circuit 56 of the circuit 50 described above. In addition, the first connection point (between the first switch 51 and the resonant circuit 56) is connected to ground. Thus, the second switch 52 of the circuit 50 is replaced with a permanent connection to ground and the first switch 51 may be omitted.

The circuit 50 described above provides a full-bridge circuit for driving the resonant circuit 56. The circuit 140 provides a half-bridge circuit for driving the resonant circuit 56. For example, the circuit 50 may be particularly suitable for providing pulses for driving the resonant circuit for inductively heating a susceptor and the circuit 140 may be particularly suitable for providing pulse edges for generating pulse responses from the resonant circuit for analysis (e.g. measurement).

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/ or other aspects described herein are not to be considered limitations on the scope of the disclosure as defined by the claims or limitations on equivalents to the claims, and that other embodiments may be utilized and modifications may be made without departing from the scope of the disclosure. Various embodiments of the disclosure may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A method comprising:
applying a pulse edge to a resonant circuit comprising an inductive element, for inductively heating a susceptor, and a capacitor, wherein the applied pulse edge induces a pulse response between the capacitor and the inductive element of the resonant circuit, wherein the pulse response has a resonant frequency;
determining a period or a frequency of the resonant frequency of the pulse response; and
converting the determined period or the determined frequency into a temperature estimate based on a temperature gradient and a calibration measurement.

2. The method as claimed in claim 1, wherein converting the determined period or the determined frequency into the temperature estimate comprises:
subtracting the calibration measurement from the determined period or the determined frequency of the resonant frequency of the pulse response; and dividing a result of the subtracting by the temperature gradient.

3. The method as claimed in claim 1, wherein the calibration measurement defines a first period or a first frequency of the resonant frequency of the pulse response at a first temperature.

4. The method as claimed in claim 3, wherein the first temperature is room temperature.

5. The method as claimed in claim 1, wherein the calibration measurement is obtained by subtracting a product of the gradient and a calibration temperature from a period of the pulse response at the calibration temperature.

6. The method as claimed in claim 1, wherein the gradient comprises a rate of change of the resonant frequency of the pulse response with respect to temperature.

7. The method as claimed in claim 1, further comprising determining the calibration measurement.

8. The method as claimed in claim 1, further comprising determining the gradient.

9. The method as claimed in claim 1, wherein the pulse edge forms part of an off-resonance pulse.

10. An apparatus comprising:
a resonant circuit comprising an inductive element and a capacitor, wherein the inductive element is for inductively heating a susceptor;
a driving circuit for applying a pulse edge to the resonant circuit, wherein the applied pulse edge induces a pulse response between the capacitor and the inductive element of the resonant circuit, wherein the pulse response has a resonant frequency; and
a processor for determining a period or a frequency of the resonant frequency of the pulse response and converting the determined period or the determined frequency into a temperature estimate based on a temperature gradient and a calibration measurement.

11. The apparatus as claimed in claim 10, wherein the processor converts the determined period or the determined frequency into the temperature estimate by:
subtracting the calibration measurement from the determined period or the determined frequency of the resonant frequency of the pulse response; and
dividing a result of the subtraction by the temperature gradient.

12. The apparatus as claimed in claim 10, wherein the processor is for determining the calibration measurement.

13. The apparatus as claimed in claim 10, wherein the processor is for determining the gradient.

14. The apparatus as claimed in claim 10, wherein the inductive element and the capacitor are connected in series.

15. The apparatus as claimed in claim 10, wherein the driving circuit is an H-bridge circuit.

16. The apparatus as claimed in claim 10, wherein the driving circuit is a half-bridge circuit.

17. A non-combustible aerosol generating device comprising the apparatus as claimed in claim 10.

18. The non-combustible aerosol generating device as claimed in claim 17, wherein the aerosol generating device is configured to receive a removable article comprising an aerosol generating material.

19. The non-combustible aerosol generating device as claimed in claim 18, wherein the aerosol generating material comprises an aerosol generating substrate and an aerosol forming material.

20. The non-combustible aerosol generating device as claimed in claim 18, wherein the removable article includes a susceptor arrangement.

21. A kit of parts comprising an article for use in a non-combustible aerosol generating system, wherein the non-combustible aerosol generating system comprises the apparatus as claimed in claim 10.

22. The kit of parts as claimed in claim 21, wherein the article is a removable article comprising an aerosol generating material.

23. A non-transitory computer-readable storage medium storing a computer program comprising instructions which, when executed by processor, cause an apparatus to perform at least the following:

apply a pulse edge to a resonant circuit comprising an inductive element, for inductively heating a susceptor, and a capacitor, wherein the applied pulse edge induces a pulse response between the capacitor and the inductive element of the resonant circuit, wherein the pulse response has a resonant frequency;

determine a period or a frequency of the resonant frequency of the pulse response; and convert the determined period or the determined frequency into a temperature estimate based on a temperature gradient and a calibration measurement.

\* \* \* \* \*